(12) United States Patent
Herrmann et al.

(10) Patent No.: US 11,434,994 B2
(45) Date of Patent: Sep. 6, 2022

(54) WHEEL DRIVE ASSEMBLY FOR A HYDROSTATIC TRACTION DRIVE AND HYDROSTATIC TRACTION DRIVE

(71) Applicant: Robert Bosch GmbH, Stuttgart (DE)

(72) Inventors: Ronny Herrmann, Neu-Ulm (DE); Matthias Mueller, Langenau (DE); Peer Mumcu, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 378 days.

(21) Appl. No.: 16/457,106

(22) Filed: Jun. 28, 2019

(65) Prior Publication Data

US 2020/0003302 A1 Jan. 2, 2020

(30) Foreign Application Priority Data

Jun. 29, 2018 (DE) ...................... 10 2018 210 732.7
Jul. 12, 2018 (DE) ...................... 10 2018 211 586.9

(51) Int. Cl.
| | |
|---|---|
| *F16H 61/421* | (2010.01) |
| *F16H 61/431* | (2010.01) |
| *F16H 61/00* | (2006.01) |
| *F16H 61/4017* | (2010.01) |
| *F16H 39/00* | (2006.01) |

(52) U.S. Cl.
CPC .......... *F16H 61/421* (2013.01); *F16H 39/00* (2013.01); *F16H 61/0025* (2013.01); *F16H 61/4017* (2013.01); *F16H 61/431* (2013.01); *F16H 2039/005* (2013.01)

(58) Field of Classification Search
CPC ... F16H 61/4017; F16H 61/425; F16H 61/431
See application file for complete search history.

(56) References Cited

U.S. PATENT DOCUMENTS

| | | | | |
|---|---|---|---|---|
| 5,678,462 | A  * | 10/1997 | Bausenhart | ........... F16H 61/425 |
| | | | | 475/83 |
| 8,671,673 | B2 * | 3/2014 | Hyodo | ............... F16H 61/4078 |
| | | | | 60/422 |
| 2010/0095663 | A1 | 4/2010 | Hyodo et al. | |
| 2011/0295473 | A1 * | 12/2011 | DeMarco | .............. F16H 61/472 |
| | | | | 701/58 |
| 2014/0244117 | A1 * | 8/2014 | Wu | ....................... F16H 59/045 |
| | | | | 701/50 |
| 2016/0257538 | A1 | 9/2016 | Oiwa et al. | |

* cited by examiner

*Primary Examiner* — Michael Leslie
*Assistant Examiner* — Matthew Wiblin
(74) *Attorney, Agent, or Firm* — Maginot, Moore & Beck LLP

(57) ABSTRACT

In a hydraulic motor and a hydrostatic traction drive with such a hydraulic motor, the regulating of the displacement of the hydraulic motor is done via a pilot-operated pressure regulator. The feedforward controller calculates an estimated motor displacement and relays this to the pressure regulator.

10 Claims, 4 Drawing Sheets

WHEEL DRIVE ASSEMBLY FOR A HYDROSTATIC TRACTION DRIVE AND HYDROSTATIC TRACTION DRIVE

This application claims priority under 35 U.S.C. § 119 to application no. DE 10 2018 210 732.7, filed on Jun. 29, 2018 in Germany, and to application no. DE 10 2018 211 586.9, filed Jul. 12, 2018 in Germany, the disclosures of which are incorporated herein by reference in their entirety.

TECHNICAL FIELD

The disclosure relates to a wheel drive assembly for a hydrostatic traction drive and to a hydrostatic traction drive having such a wheel drive assembly. A wheel drive assembly is intended to mean a hydraulic motor and an electronic control unit which controls or regulates the hydraulic motor.

BACKGROUND

Hydrostatic traction drives for mobile working machines are known, in which a hydraulic pump and one or more hydraulic motors are interconnected in a closed hydraulic circuit. The hydraulic pump is driven by an internal combustion engine—e.g. a diesel engine—and the hydraulic motors ultimately drive the mobile working machine—for example via a respective wheel.

The hydraulic pump of such traction drives is often adjustable in its delivery volume. In this way, for example, the volume flow delivered by the hydraulic pump can be changed in the closed circuit at constant rotational speed of the internal combustion engine and in this way an output rotational speed of the hydraulic motors or of the wheels can be adjusted—i.e. a travel speed of the mobile working machine.

Furthermore, it is known that the hydraulic motor or motors can also be adjusted in their displacement. In this way, for example, it is possible launching of the particular mobile working machine to increase the delivery volume of the hydraulic pump at first starting from zero up to the maximum value, in order then to reduce the displacement of the hydraulic motors starting from the maximum for faster travel. With this reduction, the output rotational speed is increased at constant volume flow.

The disclosure relates to the adjusting or regulating of the at least one hydraulic motor. Hydraulically pressure-regulated hydraulic motors are known in this regard. These are relatively cost-intensive and do not allow any variable power setting or any different travel modes.

Furthermore, rotational speed-controlled adjustments are known. The rotational speed in question may herein be that of the internal combustion engine or that of the hydraulic pump or that of the hydraulic motor. The drawback in both cases is that no physical power setting is possible. Hence, no optimal loading of the internal combustion engine and no optimal power distribution between the traction drive and an operating hydraulics of the mobile working machine, likewise driven by the internal combustion engine, is possible.

Accordingly, the problem which the disclosure proposes to solve is to create a wheel drive assembly having a hydraulic motor for a traction drive and to create a traction drive having such a wheel drive assembly with which the power of the traction drive can be regulated, e.g., on the basis of power demands.

SUMMARY

This problem is solved by a wheel drive assembly having the features described herein and by a traction drive having the features described herein.

The disclosed wheel drive assembly comprises at least one hydraulic motor, which is suitable or designed to be a secondary machine for a hydrostatic traction drive. The traction drive is preferably designed for a mobile working machine. The hydraulic motor comprises an electrical adjusting unit for adjusting the motor displacement, by which a constant or continuous relation or a constant or continuous characteristic curve between a motor drive current and the motor displacement is dictated. According to the disclosure, an electronic control unit is provided, having a pressure regulator, which regulates the motor displacement in dependence on an actual pressure and a setpoint pressure. Furthermore, the electronic control unit has a feedforward controller, by which an estimated or calculated motor displacement is relayed to the pressure regulator. The mentioned pressures are working pressures at an input of the hydraulic motor. Hence, a regulation of power of the traction drive is possible. Furthermore, various travel modes having differently attuned power characteristic are possible.

The relation between the motor drive current and the motor displacement is preferably proportional and the characteristic curve is preferably linear.

The pressure regulator is preferably nonlinear.

For reasons of operating safety, it is preferable for the pressure regulator and/or the feedforward controller to have as input variable a rotational speed limit for the hydraulic motor. In this way, the adjusting range of the feedforward controller and/or the pressure regulator is limited. This rotational speed limit can be derived from a velocity limit of the particular mobile working machine.

In one especially preferred refinement of the wheel drive assembly according to the disclosure, the preset motor displacement is determined on the basis of a model by the feedforward controller at least in dependence on the setpoint pressure and a motor rotational speed. In this way, an equalization of system tolerances is possible via the pressure regulator, which are not considered by the model-based feedforward controller. These system tolerances are, e.g., inaccuracies in the adjusting unit or in the adjustment characteristic or leakage tolerances.

The disclosed hydrostatic traction drive comprises an above-described wheel drive assembly having at least one hydraulic motor, being fluidically connected via a preferably closed circuit to an axial piston pump, comprising an adjusting unit for adjusting its pump delivery volume. The traction drive solves the same problem as the wheel drive assembly according to the disclosure and has the same benefits.

The feedforward controller can then determine the calculated motor displacement also in dependence on a pump rotational speed and a pump delivery volume or an interrelated pump swivel angle. An internal combustion engine coupled to the axial piston pump of the traction drive according to the disclosure can work under a defined and optimal load.

The pump swivel angle is preferably calculated on the basis of a model with the aid of the following volume flow balance: "delivery volume flow of the hydraulic pump−leakage at actual pressure=displacement flow of the hydraulic motor".

In one preferred embodiment, the pump swivel angle is calculated on the basis of a model in dependence on a leakage under actual pressure and on the motor rotational speed and on the pump rotational speed and on the motor drive current.

In one preferred embodiment, a pressure sensor is provided on the working line of the closed circuit carrying the high pressure. The so-called leakage under actual pressure can then be calculated on the basis of a model in dependence on the measured actual pressure.

Preferably, the setpoint pressure is calculated on the basis of a model in dependence on the pump rotational speed and/or a forward-neutral-reverse ("FNR") unit and/or an inching pedal and/or a limit load regulator. A control element to relay a driver's wish and a motor rotational speed may also be taken into account. This makes possible a model-based control of the demanded setpoint pressures of the hydraulic motor and in the working line of the traction drive according to the disclosure carrying high pressure. Instead of the pump rotational speed, an equal or proportional rotational speed of the internal combustion engine may also be considered. In this way, the power of the traction drive can be regulated on the basis of a power demand from the driver. The control element can be an accelerator pedal.

For reasons of operating safety, it is preferable for the pressure regulator and/or the feedforward controller to have as input variable a rotational speed limit of the axial piston pump. In this way, the adjusting range of the feedforward controller and/or the pressure regulator is limited. This rotational speed limit of the axial piston pump can be derived from a rotational speed limit of the driving internal combustion engine.

The axial piston pump is preferably of swash-plate design.

The adjusting unit of the axial piston pump preferably comprises an actuating cylinder having a first actuating pressure chamber, in which a first actuating pressure can be set via a first pressure reducing valve. The first actuating pressure is dependent on a preselected first current strength at a first magnet of the first pressure reducing valve. In this way, a so-called ET-adjusting unit for the axial piston pump is formed. Preferably, the first actuating pressure is proportional to the first current strength.

In one preferred refinements, in the normal pump operation of the axial piston pump, the actual rotational speed and the first actuating pressure act in the direction of an increase in the pump delivery volume or in the pump swivel angle, while the pressure acts in the direction of a decrease in the pump delivery volume or in the pump swivel angle.

In one especially preferred refinement, the actuating cylinder comprises a second actuating pressure chamber, which acts in opposition to the first actuating pressure chamber, and in which a second actuating pressure can be set via a second pressure reducing valve. This occurs independently for the two actuating pressure chambers. The second actuating pressure is dependent on a preselected second current strength at a second magnet of the second pressure reducing valve. Preferably, the second actuating pressure is proportional to the second current strength. Hence, the second actuating pressure acts in the direction of the decrease in the stroke volume. In this case, the difference between the first actuating pressure and the second actuating pressure can be called the effective actuating pressure difference. Hence, the axial piston pump is also controllable when it changes to a motor mode, which may occur due to a towing operation of the traction drive according to the disclosure.

BRIEF DESCRIPTION OF THE DRAWINGS

An exemplary embodiment of the traction drive according to the disclosure is represented in the figures, in which.

DETAILED DESCRIPTION

Figure 1:
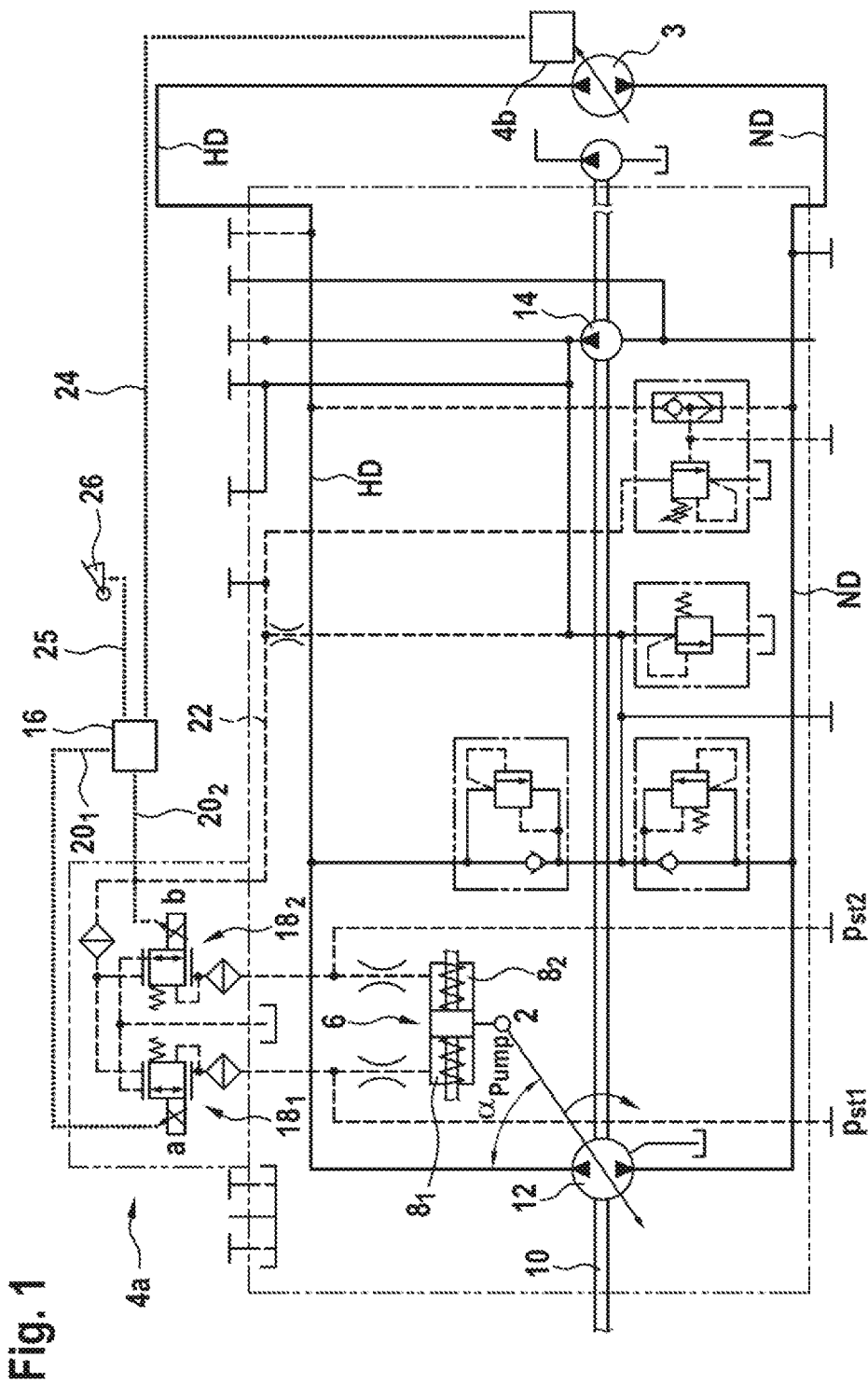
FIG. 1 shows a circuit diagram of the traction drive according to the disclosure in accordance with the exemplary embodiment.

FIG. 1 shows a circuit diagram of the exemplary embodiment of the traction drive according to the disclosure. Only the components relevant to the disclosure are described. The traction drive has an axial piston pump 1, on whose housing two working ports A, B are formed. Via the working ports A, B and via working lines of a closed circuit, a hydraulic motor 3 is fluidically connected to the axial piston pump 1. A wheel (not shown) is coupled in a rotationally fixed manner to an output shaft of the hydraulic motor 3. In this way, a traction drive is formed for a mobile working machine (not shown in more detail).

The axial piston pump 1 is designed with a swash plate 2, whose pump swivel angle $\alpha_{Pmp}$ can be set via an adjusting unit 4a. For this, a dual-action actuating cylinder 6 is used, having a first actuating pressure chamber $8_1$ and, acting in opposition to this, a second actuating pressure chamber $8_2$.

A first control pressure $p_{st1}$ acts in the first actuating pressure chamber $8_1$ in the direction of an increase in the swivel angle $\alpha_{Pmp}$ and thus in the direction of an increase in the pump delivery volume $Vg_{Pmp}$. Acting in opposition to this is a second actuating pressure $p_{st2}$ in the second actuating pressure chamber $8_2$ in the direction of a decrease in the swivel angle $\alpha_{Pmp}$ and thus in the direction of a decrease in the pump delivery volume $Vg_{Pmp}$. In this way, an actuating pressure difference can be defined $\Delta p_{st} = p_{st1} - p_{st2}$, which by definition always acts in the direction of an increase in the pump swivel angle $\alpha_{Pmp}$ or in the pump delivery volume $Vg_{Pmp}$.

A drive shaft 10 of the axial piston pump 1 drives its power unit 12 and furthermore also a feed pump 14. The drive shaft 10 is driven by a diesel engine (not shown), whose crankshaft rotates with a rotational speed $n_{Eng}$. Therefore, the drive shaft 10 rotates with the same or with a proportionally altered pump rotational speed $n_{Pmp}$.

The pump rotational speed $n_{Pmp}$ acts together with the actuating pressure difference $\Delta p_{st}$ in the direction of an increase in the pump swivel angle $\alpha_{Pmp}$. More precisely, an increase in the pump rotational speed $n_{Pmp}$ acts in this manner.

When the axial piston pump 1 shown is supplying the hydraulic motor 3 by its working ports A, B, let it be assumed that working port B is the high-pressure port during forward travel of the mobile working machine. Accordingly, the working line connected to the working port B is denoted as high pressure HD, while the other working line is denoted as low pressure ND. The high pressure HD acts in the direction of a decrease in the pump swivel angle $\alpha_{Pmp}$. These mentioned effects of the actuating pressure difference $\Delta p_{st}$, the pump rotational speed $n_{Pmp}$ and the high pressure HD are measured. Their aforementioned effects on the pump swivel angle $\alpha_{Pmp}$ are saved in an electronic control unit 16 of the wheel drive assembly according to the disclosure as formulas and/or as characteristic maps or characteristic curves. In this way, operating points of the axial piston machine 1 can be actuated without therefore requiring feedback in the sense of a feedback control circuit.

The two actuating pressures $p_{st1}$, $p_{st2}$ are controlled by two pressure reducing valves $18_1$, $18_2$. These have a respective electromagnet a, b, which are connected via a respective electrical line $20_1$, $20_2$ to the electronic control unit 16. The two pressure reducing valves $18_1$, $18_2$ are designed such that the respective actuating pressure $p_{st1}$, $p_{st2}$ is proportional to the respective current strength $i_{Pmp\ Fwd}$, $i_{Pmp\ Rvs}$.

The two pressure reducing valves $18_1$, $18_2$ are supplied at their inlet side from the feed pump 14 via a feed pressure line 22.

Via an electrical line 25, a control element 26 is connected to the control unit 16 in order to relay the driver's wish, the control element 26 being preferably designed as an accelerator pedal.

As a secondary machine, the aforementioned hydraulic motor 3 is connected to the two working lines HD, ND of the connected circuit. A motor displacement $Vg_{Mot}$ is adjustable via an electrical adjusting unit 4b. This is connected via an electrical line 24 to the control unit 16 and is controlled and regulated in the manner of the disclosure described below.

Figure 2:
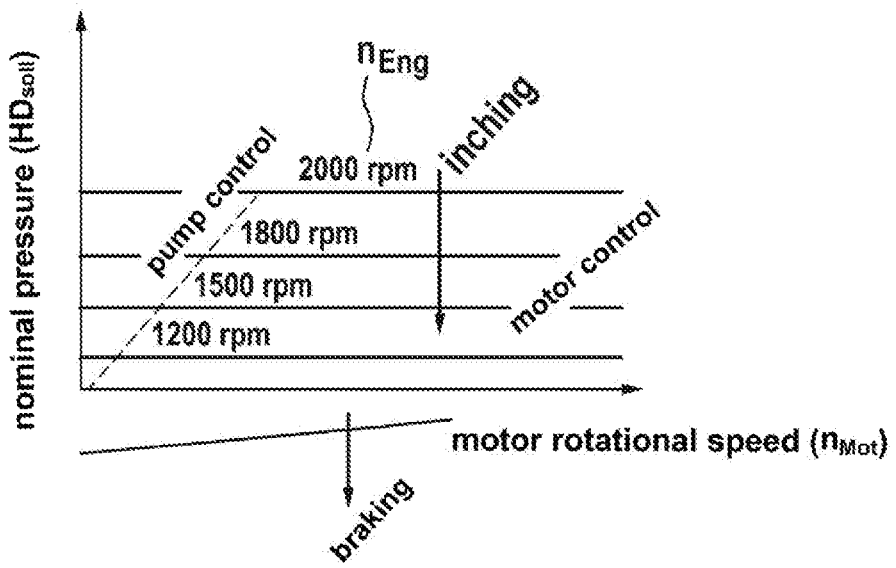
FIG. 2 shows a diagram for the exemplary embodiment of FIG. 1.
Figure 3:
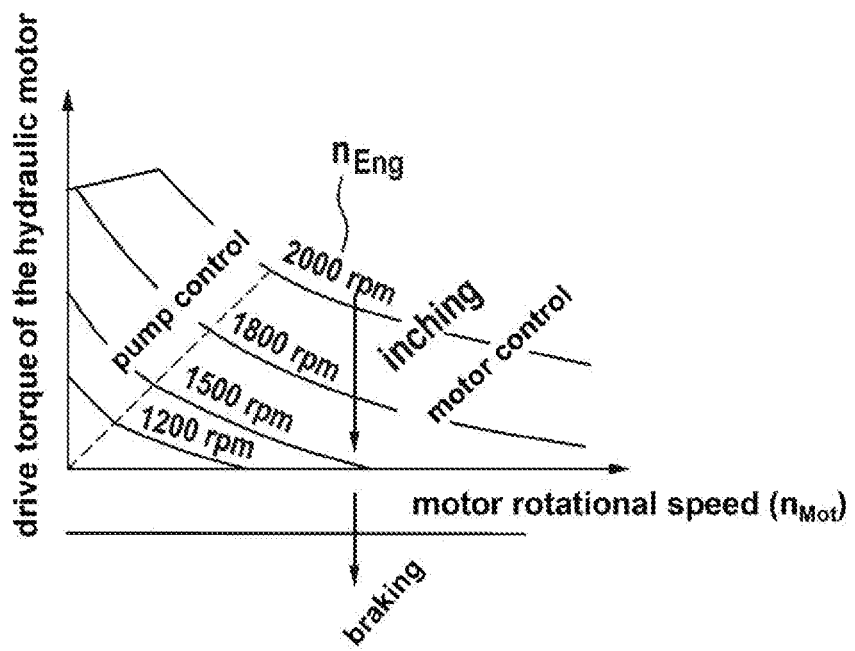
FIG. 3 shows a further diagram for the exemplary embodiment of FIG. 1.

FIGS. 2 and 3 respectively show a schematic diagram in regard to the control of the traction drive as per FIG. 1. In both diagrams, the motor rotational speed $n_{Mot}$ and, as examples, several rotational speeds $n_{Eng}$ of the internal combustion engine are plotted along the X-axis. In FIG. 2, the setpoint pressure $HD_{soll}$ is plotted on the Y-axis. It can be seen herein that the setpoint pressure $HD_{soll}$ is increased by increasing rotational speed $n_{Eng}$ of the internal combustion engine. In FIG. 3, the output torque of the hydraulic motor is plotted on the Y-axis.

In both diagrams it is shown schematically that, during a starting and an increase in the velocity of the mobile working machine, corresponding to the motor rotational speed $n_{Mot}$, at first a region of a pump controller and then a region of a motor controller is provided. More precisely, at first the adjusting unit 4a is used to increase the pump swivel angle $\alpha_{Pmp}$ and then the adjusting unit 4b is used to decrease the motor displacement $Vg_{Mot}$. If the hydraulic motor 3 is also an axial piston machine, this occurs through reducing the swivel angle of the hydraulic motor 3.

FIG. 2 shows in an exemplary manner the setpoint pressure behavior in dependence on the current rotational speed $n_{Eng}$ of the internal combustion engine and the influence of an inching pedal. As per FIG. 2, by presetting the setpoint pressure characteristic it is possible to define the power of the traction drive. As per FIG. 3, it is possible to define the characteristic of the output torque of the hydraulic motor. The preconditions for this are that the pump swivel angle $\alpha_{Pmp}$ and the rotational speed $n_{Eng}$ of the internal combustion engine are constant, as shown by FIG. 2.

Figure 4:
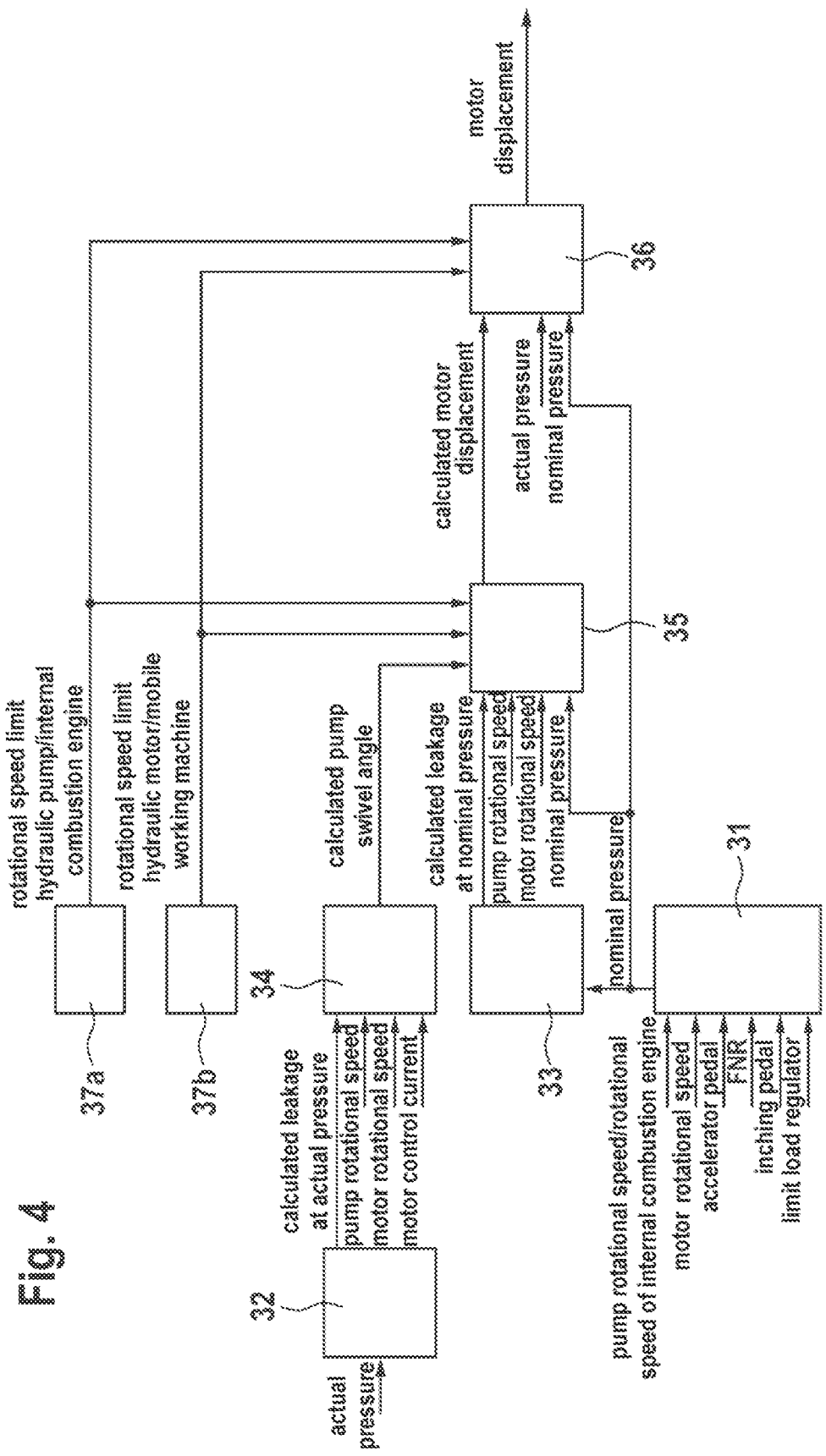
FIG. 4 shows a diagram with logic blocks and signal flows of the exemplary embodiment of FIG. 1.

FIG. 4 shows logic blocks and signal flows of the control and regulation of the hydraulic motor 3 according to the disclosure. In logic block 31 there is a calculation of the setpoint pressure $HD_{soll}$ in dependence on the pump rotational speed $n_{Pmp}$ or the rotational speed $n_{Eng}$ of the internal combustion engine and in dependence on the motor rotational speed $n_{Mot}$ and in dependence on the accelerator pedal 26 and in dependence on a FNR and in dependence on the inching pedal and in dependence on a limit load regulator.

First of all, the setpoint pressure $HD_{soll}$ is preset as a function of the rotational speed $n_{Eng}$ of the internal combustion engine. The precise dependency on the rotational speed $n_{Eng}$ is parametrized with a characteristic curve when placing the traction drive of the disclosure in operation, such that the power of the internal combustion engine is utilized meaningfully in operation. The technical details of the internal combustion engine and the kind of usage of the mobile working machine play a role here.

Furthermore, the inching pedal has an influence on the setpoint pressure $HD_{soll}$. Depending on the position of the inching pedal, an "inch factor" between 0% and 100% is determined with a characteristic curve, which acts in multiplicative manner on the setpoint pressure $HD_{soll}$ and can therefore reduce it if the driver desires. In addition, there is a "limit load regulator factor" between 0% and 100%, which reduces the setpoint pressure $HD_{soll}$ when the internal combustion engine is overloaded.

The driving direction lever acts as follows on the setpoint pressure $HD_{soll}$: when the desired driving direction is set at "neutral", then the setpoint pressure $HD_{soll}$ is set at 0 bar, because the driver then wishes a standstill.

The setpoint pressure $HD_{soll}$ may furthermore also be dependent on the motor rotational speed $n_{Mot}$, and on the position of the control element 26, which is preferably an accelerator pedal.

This setpoint pressure $HD_{soll}$ serves as an input variable for a logic block 33, in which a model-based determination of the leakage at setpoint pressure $HD_{soll}$ occurs, and for a feedforward controller 35, in which a model-based determination of the motor displacement $Vg_{Mot}$ occurs, and for a nonlinear pressure regulator 36, which ultimately outputs the motor displacement $Vg_{Mot}$ to be set.

Further input variables for the feedforward controller 35 are the calculated leakage at setpoint pressure $HD_{soll}$ of the logic block 33 and the pump rotational speed $n_{Pmp}$ and the motor rotational speed $n_{Mot}$, which are detected by respective rotational speed sensors (not shown). From these values, the feedforward controller 35 calculates a motor displacement $Vg_{Mot}$. Use is made herein of the fact that the leakage is a linear function of the pressure.

The model-based regulator 36 is based on the following volume flow balance:

delivery volume flow $Q_{Pmp}$ of the hydraulic pump=displacement flow $Vg_{Mot}$ of the hydraulic motor+leakage at setpoint pressure $HD_{soll}$ This equation is solved for the displacement flow $Vg_{Mot}$, which is then a function of
 the pump rotational speed $n_{Pmp}$ (measured by sensor)
 the motor rotational speed $n_{Mot}$ (measured by sensor)
 the pump swivel angle $\alpha_{Pmp}$ (estimated with model)
 the leakage at setpoint pressure $HD_{soll}$ (estimated with model).

The motor displacement flow $Vg_{Mot}$ is then computed with these values, wherein the pump rotational speed $n_{Pmp}$ and the pump swivel angle $\alpha_{Pmp}$ are smoothed out with signal filters in order to suppress oscillations of the system.

The motor displacement $Vg_{Mot}$ calculated by the feedforward controller 35 serves as an approximate value or starting value for the nonlinear pressure regulator 36. The pressure regulator 36 also has as a further input variable the measured actual pressure $HD_{ist}$.

The actual pressure $HD_{ist}$ also serves as an input variable for a logic block 32 in which a model-based determination of the leakage at actual pressure $HD_{ist}$ is done. This value and furthermore the pump rotational speed $n_{Pmp}$ and the motor rotational speed $n_{Mot}$ and the motor drive current $i_{Pmp\ Fwd}$ or $i_{Pmp\ Rvs}$ serve as input variables for a logic block 34. In this block, a model-based determination of the pump swivel angle $\alpha_{Pmp}$ is done, which serves as a further input variable for the feedforward controller 35.

Finally, an overspeeding protection means 37a and a velocity limiting means 37b are optionally also provided, whose limit values are taken into account by the feedforward controller 35 and by the pressure regulator 36.

Figure 5:
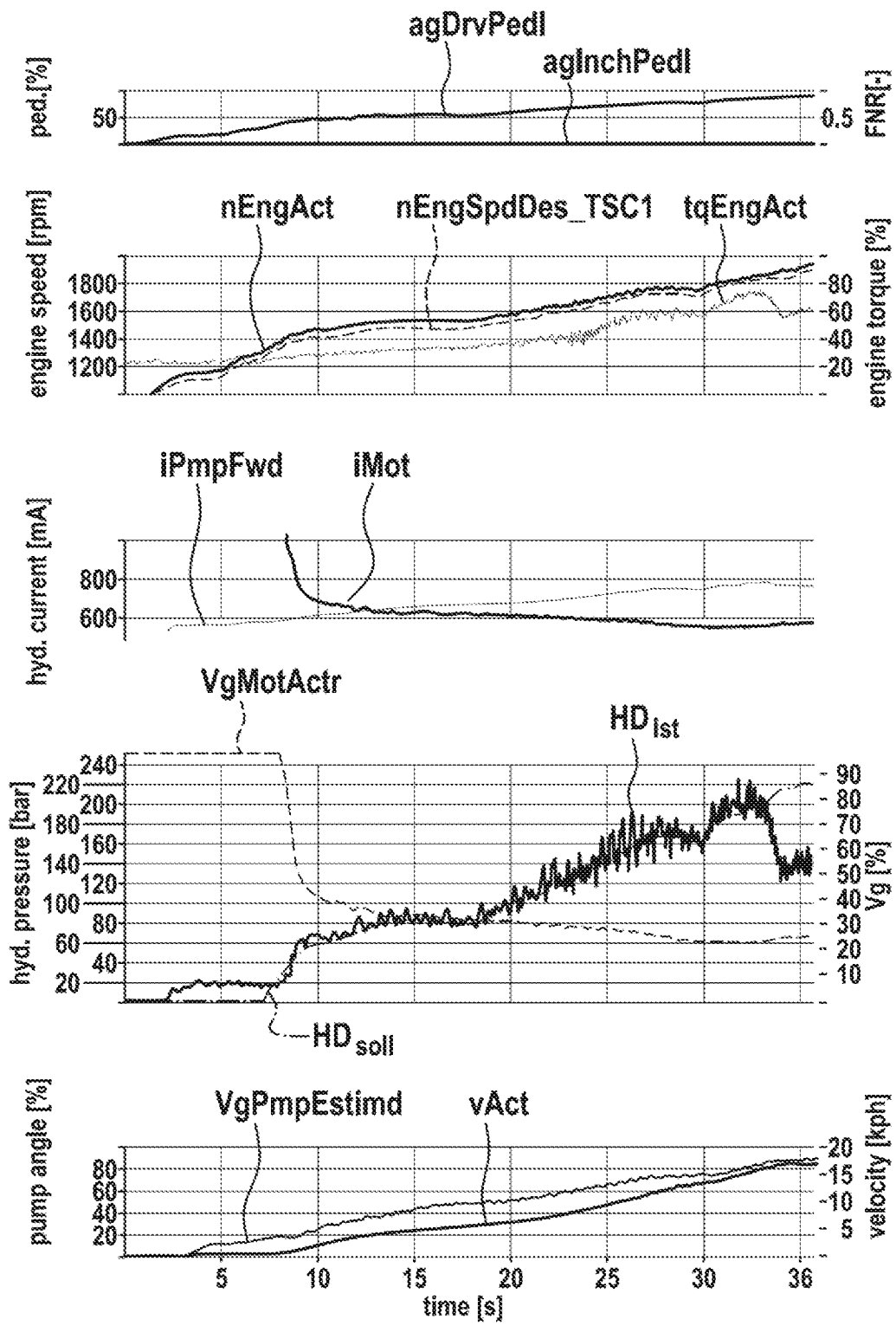
FIG. 5 shows a diagram with multiple parameters plotted against time during launching of the traction drive according to the exemplary embodiment of FIG. 1.

FIG. 5 shows various values and parameters of the traction drive according to the disclosure as per the preceding figures. More precisely, the behavior of the pressure regulator 36 is shown during a slow acceleration process of the traction drive or the mobile working machine. The driver sets a power request via the control element, which is preferably the accelerator pedal, which request is converted into a setpoint pressure $HD_{soll}$ (dot and dash line). The model-based regulator 35 adapts the motor displacement $Vg_{Mot}$ so that the actual pressure $HD_{ist}$ is adjusted.

A hydraulic motor and a hydrostatic traction drive therewith are disclosed, wherein the regulating of the displacement of the hydraulic motor is done via a pilot-operated pressure regulator. The feedforward controller calculates an estimated motor displacement and relays this to the pressure regulator.

The invention claimed is:

1. A wheel drive assembly for a hydrostatic traction drive comprising:
   a hydraulic motor comprising an electrical adjusting unit configured to adjust a motor displacement of the hydraulic motor to achieve a continuous relation between a motor drive current and the motor displacement; and
   an electronic control unit comprising:
      a pressure regulator configured to regulate the motor displacement in dependence on an actual pressure supplied to the hydraulic motor and a setpoint pressure of the hydraulic motor; and
      a feedforward controller associated with the pressure regulator and configured to preset a preset motor displacement,
   wherein the preset motor displacement is a calculated motor displacement calculated based on a model via the feedforward controller based on the setpoint pressure, a motor rotational speed, a pump rotational speed, and one of a pump delivery volume and a pump swivel angle.

2. The wheel drive assembly according to claim 1, wherein the pressure regulator is nonlinear.

3. The wheel drive assembly according to claim 1, wherein at least one of the pressure regulator and the feedforward controller have, as an input variable, a rotational speed limit for the hydraulic motor.

4. A hydrostatic traction drive comprising:
   a wheel drive assembly comprising:
      a hydraulic motor comprising an electrical adjusting unit configured to adjust a motor displacement of the hydraulic motor to achieve a continuous relation between a motor drive current and the motor displacement; and
      an electronic control unit comprising:
         a pressure regulator configured to regulate the motor displacement in dependence on an actual pressure and a setpoint pressure; and
         a feedforward controller associated with the pressure regulator and configured to preset a preset motor displacement; and
   an axial piston pump comprising an adjusting unit configured to adjust a pump delivery volume of the axial piston pump,
   wherein the preset motor displacement is a calculated motor displacement calculated based on a model via the feedforward controller based on the setpoint pressure, a motor rotational speed, a pump rotational speed, and one of the pump delivery volume and a pump swivel angle.

5. The hydrostatic traction drive according to claim 4, wherein the pump swivel angle is a calculated pump swivel angle, which is calculated on the basis of a model with the aid of a volume flow balance.

6. The hydrostatic traction drive according to claim 4, wherein the pump swivel angle is a calculated pump swivel angle, which is calculated on the basis of a model in dependence on a leakage under actual pressure, on the motor rotational speed, and on the pump rotational speed and on the motor drive current.

7. The hydrostatic traction drive according to claim 6, wherein the leakage under actual pressure is a calculated leakage under actual pressure, which is calculated on the basis of a model in dependence on the actual pressure.

8. The hydrostatic traction drive according to claim 4, wherein the setpoint pressure is determined based on a model in dependence on at least one of: the pump rotational speed, the motor rotational speed, a control element to relay a driver's wish, a forward-neutral-reverse unit, an inching pedal, and a limit load regulator.

9. The hydrostatic traction drive according to claim 4, wherein at least one of the pressure regulator and the feedforward controller has, as an input variable, a rotational speed limit of the axial piston pump.

10. The hydrostatic traction drive according to claim 4, wherein the adjusting unit of the axial piston pump comprises an actuating cylinder having a first actuating pressure chamber in which a first actuating pressure is set via a first pressure reducing valve, the first actuating pressure being dependent on a preselected first current strength at a first magnet of the first pressure reducing valve.

* * * * *